(12) United States Patent
Vince

(10) Patent No.: US 7,609,836 B2
(45) Date of Patent: Oct. 27, 2009

(54) SEAMLESS SWITCHING BETWEEN MULTIPLE PRE-ENCRYPTED VIDEO FILES

(75) Inventor: Lawrence D. Vince, Lansdale, PA (US)

(73) Assignee: General Instrument Corporation, Horsham, PA (US)

(*) Notice: Subject to any disclaimer, the term of this patent is extended or adjusted under 35 U.S.C. 154(b) by 0 days.

(21) Appl. No.: 11/759,014

(22) Filed: Jun. 6, 2007

(65) Prior Publication Data
US 2007/0230699 A1 Oct. 4, 2007

Related U.S. Application Data

(62) Division of application No. 10/455,835, filed on Jun. 6, 2003, now Pat. No. 7,317,797.

(51) Int. Cl.
*H04N 7/167* (2006.01)
(52) U.S. Cl. ...................................... 380/239
(58) Field of Classification Search .............. 380/239, 380/22, 201, 277, 211
See application file for complete search history.

(56) References Cited

U.S. PATENT DOCUMENTS 5,742,681 A 4/1998 Giachetti et al.
2002/0108035 A1* 8/2002 Herley et al. ............... 713/165

FOREIGN PATENT DOCUMENTS

EP 1022900 7/2000
WO 2001015448 3/2001
WO WO 0215579 A1 * 2/2002

OTHER PUBLICATIONS

PCT International Search Report for PCT/US03/17970. Dated Sep. 10, 2003.
"Guide to the Use of the ATSC Digital Television Standard" Ref: XP-002255337, Advanced Television Systems Committee. Doc. A/54, dated Oct. 4, 1995. pp. 1-136.
Forms PTO-892 - Notices of References Cited for U.S. Appl. No. 10/455,835. US Patent No. 7,317,794.
Office Actions for U.S. Appl. No. 10/455,835. US Patent No. 7,317,794.

* cited by examiner

*Primary Examiner*—Jung Kim
*Assistant Examiner*—Samson B Lemma
(74) *Attorney, Agent, or Firm*—Larry T. Cullen

(57) ABSTRACT

In a video on demand (VOD) system, methods and apparatus are provided for seamlessly switching back and forth between two pre-encrypted files having changing encryption keys Such switching back and forth may be required when a VOD server stores both a "normal" copy of a movie and a "special" copy such as a "trick-play" version for, e g, fast forward and rewind effects Instead of using keys with changing parities in both streams, the special stream is encrypted with keys using the same parity (even or odd), while the normal stream is encrypted with one dynamic key (odd or even) and one fixed key (even or odd) Other special streams, such as scene branch streams and alternate angle streams can also be accommodated.

9 Claims, 2 Drawing Sheets

SEAMLESS SWITCHING BETWEEN MULTIPLE PRE-ENCRYPTED VIDEO FILES

This application claims the benefit of U.S. provisional application No. 60/386,867 filed on Jun. 7, 2002, which is incorporated herein and made a part hereof by reference

TECHNICAL FIELD OF THE INVENTION

The present invention relates to copy protection techniques and more particularly to encryption for interactive, on-demand digital program content such as video-on-demand (VOD) program material (files) which is delivered (streamed) over cable television, satellite television, and other wired or wireless broadband communications networks.

BACKGROUND OF THE INVENTION

Video On Demand

Video On Demand (VOD) is an interactive application offered on a digital television (DTV) network, other movie network, or the like. VOD is made practical by broadband digital broadcasting via cable and satellite Unlike earlier services where subscribers were granted access only to scheduled encrypted broadcasts (e g, movie channels, special events programming, etc.), these "on-demand" services permit a subscriber to request a desired video, audio or other programming at any time. Upon receiving the request for programming (and, presumably, authorization to bill the subscriber's account), the service provider then transmits the requested program to the subscriber for viewing. Audio On Demand provides similar functionality for sound files (versus video files). In the main hereinafter, VOD is discussed.

The Motion Picture Association of America (MPAA) is a trade association of the American film industry, whose members include the industry's largest content providers (i.e., movie producers, studios). The MPAA requires protection of VOD content from piracy Without security to protect the content, the member content providers will not release their content (e g, movies) for VOD distribution Without the up-to-date, high-quality content, the VOD market becomes non-viable For content providers and operators, the need for a secure VOD solution is therefore necessary. Two different approaches can be selected—either "pre-encryption," or "encryption at playout." Pre-encryption means that the content is encrypted before being stored (as a file) on the video server, the goal being to encrypt the content as soon as possible, for example as soon as it leaves the production studio. Pre-encryption is well suited to programming material having fixed content, such as movies, and is generally preferred for interactive applications. Encryption at playout means that the content is encrypted in real time, and is suitable for the secure broadcasting of live events. In the main hereinafter, VOD with pre-encrypted content is discussed.

As used herein, a "file" is the video source material which is stored, preferably encrypted, and a "stream" is the digital signal derived from the file when the file is broadcast (transmitted) to end user(s).

Modern VOD services give the user control over the playout of a selected program with features functionally comparable to those of a video cassette recorder (VCR)—for example, "trick play" (e g, fast-forward, rewind, etc.). This requires that more than one file be maintained for a given program content—for example, a "normal" file and a "special" trick-play file which is associated with the normal file. The user is able to transition between the two files, interactively. Both files must, of course, be encrypted (Again, in the main hereinafter, VOD with pre-encrypted content is discussed.)

MPEG-2

A digital TV signal is typically transmitted as a stream of MPEG-2 data, although other type streams are expected to become available in the future (e.g., MPEG-4) that are within the scope of the present invention MPEG-2 is a method for compressed representation of video and audio sequences using a common coding syntax defined in the document ISO/IEC 13818 by the International Organization for Standardization. The MPEG-2 Video Standard specifies the coded bit stream for high-quality digital video The MPEG standard defines a transport stream (TS) for transmitting data from one or more MPEG streams Each transport stream (TS) has a data rate of up to 40 megabits per second, which is enough for seven or eight separate TV channels/programs (also referred to as services) Each transport stream consists of a set of sub-streams (known as elementary streams), where each elementary stream can contain either MPEG-2 encoded audio, MPEG-2 encoded video, or data encapsulated in an MPEG-2 stream A multiplexer assigns a packet identifier (PID) to each elementary stream, and splits the elementary streams into transport packets which are inserted into a transport stream (TS) The multiplexer can combine several MPEG streams into a single transport stream (TS)

MPEG-2 accommodates scrambling at the elementary stream level and/or at the transport stream level. The MPEG-2 specification contains a scrambling control field of two bits both in the TS packet header and in the PES packet header Generally, the first scrambling control bit indicates whether or not the payload is scrambled (encrypted), and the second scrambling control bit indicates the use of Even or Odd Key, as follows.

| Bit Values | Description |
| --- | --- |
| 00 | No scrambling of packet payload |
| 01 | Reserved for future DVB use |
| 10 | Packet scrambled with even key |
| 11 | Packet scrambled with odd key |

Encryption Schemes

Present encryption schemes typically employ a simple two-key encryption scheme to encrypt VOD content. Both keys taken together are essentially a single "cryptographic key set" used to encrypt the entire content One of the keys comprises one or more "public keys" delivered with the content. The other key is required in combination with the public key(s) to decrypt the content, and is delivered as part of a successful authorization or licensing process. Neither key is useful absent the other key.

A problem with encrypting the VOD content with a single set of "public keys" is that an aggressive "attack" using exhaustive cryptographic "cracking" techniques could discover a pair of keys that will decode the content Once broken, the content can be reproduced "in the clear" (i.e., unencrypted), thereby completely thwarting the security offered by the encryption scheme For highest security and greatest protection against cryptographic "cracking" attacks by "pirates", it is highly desirable to increase the number of separate cryptographic keys used by changing the keys at numerous points during the encryption process In other words, it is generally highly desirable to encrypt VOD files with frequently changing cryptographic keys According to the MPEG-2 standard, when packets are encrypted with a changing key, it is necessary to toggle between even and odd parity key numbers Pre-encryption of video (e.g., MPEG-2) files is a cost effective method for enabling security for movies and other types of pre-recorded files However, the pre-encryption of video when using more than two encryption keys has been problematic in the past In particular, when it is desired to switch back and forth between two or more pre-encrypted files (such as a normal file and a special trick play mode file that provides, e.g., fast forward or rewind), it is very difficult to maintain encryption key synchronization (key sync) This problem can cause errors during decryption in the decoder, and has negatively impacted the introduction and ability to provide satisfactory and cost effective video on demand (VOD) services with trick play modes. The problem manifests itself when the normal file that is being played back is encrypted with an even (or odd) parity key choice and navigation moves to playback of a trick play (e.g., fast forward or rewind) file where the pre-encryption key is also an even (or odd) choice, yet different from the key that was used in the normal file. The same problem can occur when moving (transitioning, navigating) back from the trick play file to the normal file In the past, real time encryption has been proposed to solve this problem. However, real time encryption requires substantial hardware resources in order to function acceptably, and therefore carries a significant cost

GLOSSARY

Unless otherwise noted, or as may be evident from the context of their usage, any terms, abbreviations, acronyms or scientific symbols and notations used herein are to be given their ordinary meaning in the technical discipline to which the invention most nearly pertains The following glossary of terms is intended to lend clarity and consistency to the various descriptions contained herein, as well as in prior art documents.

| | |
|---|---|
| ECM | Entitlements Control Message. Entitlement Control Messages are private conditional access information which specify control words and possibly other, typically stream-specific, scrambling and and/or control parameters |
| EMM | Entitlements Management Message. Conditional access messages used to convey entitlements or keys or other parameters to users, or to invalidate or delete entitlements or keys. For example, an EMM can be used in combination with an ECM to determine an encryption key |
| ER | Encryption Record. Contains information about how specific program content is encoded, rules for decoding, etc |
| ERS | ECM Renewal System |
| MPEG | Moving Pictures Experts Group |
| MPEG-2 | MPEG-2 is the standard for digital television (officially designated as ISO/IEC 13818, in 9 parts) |
| MSO | Multiple System Operator A company that owns multiple cable television systems |
| OLES | Off-Line Encryption Station |
| PES | Packetized Elementary Stream |
| STB | Set Top Box An electronic device that allows a television (TV) set to connect to the Internet, game systems, cable television systems or satellite television systems |
| TS | Transport Stream |
| VOD | Video-On-Demand The service of providing content through subscriber selection off a large menu of options, available to a viewer at any time |

SUMMARY OF THE INVENTION

According to the invention, in a video on demand (VOD) system, methods and apparatus are provided for seamlessly switching back and forth between two pre-encrypted files having changing encryption keys Such switching back and forth may be required when a VOD server stores both a "normal" copy of a movie and a "special" copy such as a "trick-play" version for, e g, fast forward and rewind effects The invention addresses and overcomes problems associated with using encryption keys having changing parities in both streams In an embodiment of the invention, instead of using keys with changing parities in both streams, the normal stream is encrypted with one dynamic key (odd or even) and one fixed key (even or odd), and the special stream is encrypted with keys having the same parity (even or odd) Other special streams, such as scene branch streams and alternate camera angle streams can also be accommodated Typically, special streams (files) which are related to or associated with the normal stream are processed If the special stream (file) were completely unrelated, then there might be other aspects of switch back and forth that would make the transitions non-seamless The general intent of the present invention is to allow the encryption to take place on top of seamless transitions so that the encryption does not cause undue side effects. Also, when pre-encrypting, the files are grouped together so that they can be encrypted with a common key set Without this 'pre-grouping' of content (thus causing a relationship), pre-encryption potential degrades to the point where 'every packet would be encrypted with the same key', which is not desired Additionally, it should be understood that having a fixed key rather than a changing key for the trick play file represents an acceptable 'compromise' The overall intent is to protect the totality of the content. Trick play files are usually just snippets of the video (e.g., a collection of stills) with either no audio or significantly modified audio As such, this material is not generally very interesting to a hacker, pirate or counterfeiter.

The present invention provides a technique for allowing VOD navigation between two (or more) files, without requiring real time encryption. Instead of providing real-time encryption, the key sync problem is solved by applying a minor restriction on pre-encryption that does not significantly adversely impact the security of the data. More specifically, methods and apparatus are provided for pre-encrypting video files with normal rate and trick play (e.g., fast-forward/rewind) files to make switching (transitioning) between the files as seamless as possible when more than two keys are used for encryption. The disclosed techniques are also useful for switching between normal files and other types of files, such as scene branch files, alternate camera angle files, or other special files that are desired to be switched with a file containing plain (i.e., normal) video. The invention also solves the problem of ping-ponging between two files where the MPEG encryption parity bit may be the same

DETAILED DESCRIPTION OF THE INVENTION

Figure 1:
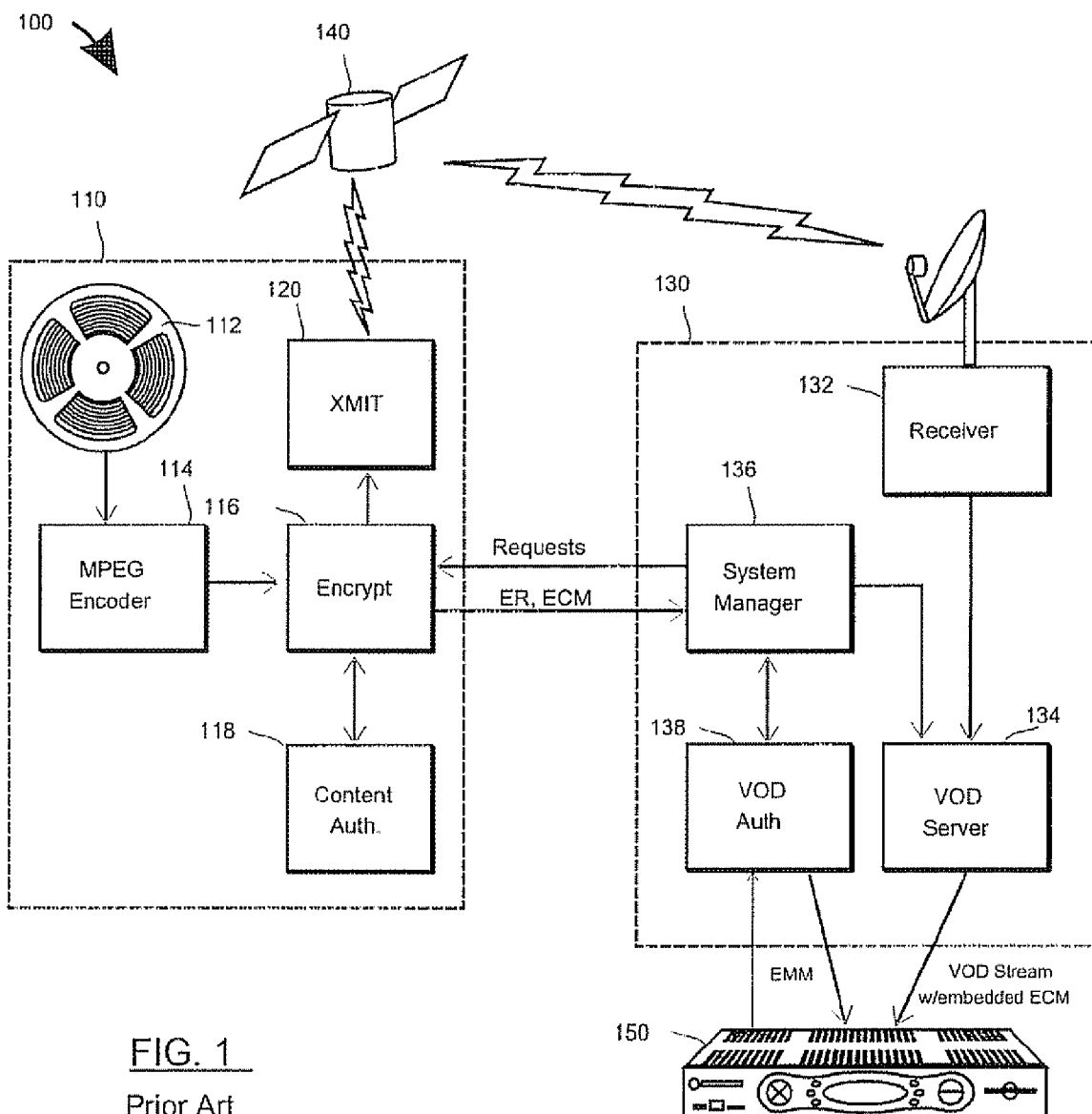
FIG. 1 is a block diagram of a system for delivering pre-encrypted video content

The present invention relates to copy protection techniques and, more particularly, to copy protection for interactive, on-demand digital program content such as video-on-demand (VOD) programming distributed (e.g.) via cable and satellite networks In order to protect against interception and copying of digital program content, it is known to use a pre-encryption scheme whereby server-based VOD content is stored in an encrypted form, then delivered directly to viewers without further encryption processing. The VOD content is encrypted at the point where it is encoded, and is distributed to content resellers (e.g., MSOs, satellite operators, etc) in encrypted form. Content encoders generally do not distribute directly to end-users (viewers) Typically, encryption is accomplished separately and uniquely for each reseller FIG. 1 is a block diagram of a system 100 for delivery of pre-encrypted program content At a content encoder's location 110, master content 112 (e g, movies and other program content) is encoded into digital form via a MPEG-2 encoder 114 This content is then encrypted in an encryption system 116. A content authorization system 118 is used to manage, renew and verify valid licensing for the encrypted content, permitting encryption by the encryption system 116 only if valid licensing exists for any particular destination. The encryption system 116 generates a "personalized" encryption for each destination content reseller (e g, MSO). The encrypted content is transmitted via a transmitter 120 over a suitable transmission medium 140 (satellite shown, but can be Internet, cable, or any other suitable delivery mechanism) to a receiver 132 at a reseller's location The receiver 132 receives the encrypted content and stores it in a VOD server 134 from which it can be re-broadcast to end-users. A system manager 136 (computer system that controls operation of a reseller's various transmission and communications resources) communicates with the encryption system 116 to make requests for program content, and to receive encryption records (ER) defining how the requested program content is encrypted/encoded and to receive entitlement control messages (ECMs) associated with the encryption of the program content Typically, the encryption system 116 and the system manager 136 are parts of an ECM Renewal System (ERS) by which authorizations to distribute/decode program content are managed and renewed.

At the reseller's (e g, MSO's) location, a user authorization system receives requests from end users for program content and verifies that appropriate authorizations are in place for the end user to view the requested content. If they are, then the user authorization system instructs the VOD server to deliver the requested (encrypted) content to the user's VOD playback device 150 (e.g., set-top box) and generates an Entitlements Management Message (EMM) for the requested content for delivery to the VOD playback device 150 along with the requested content.

Figure 2:
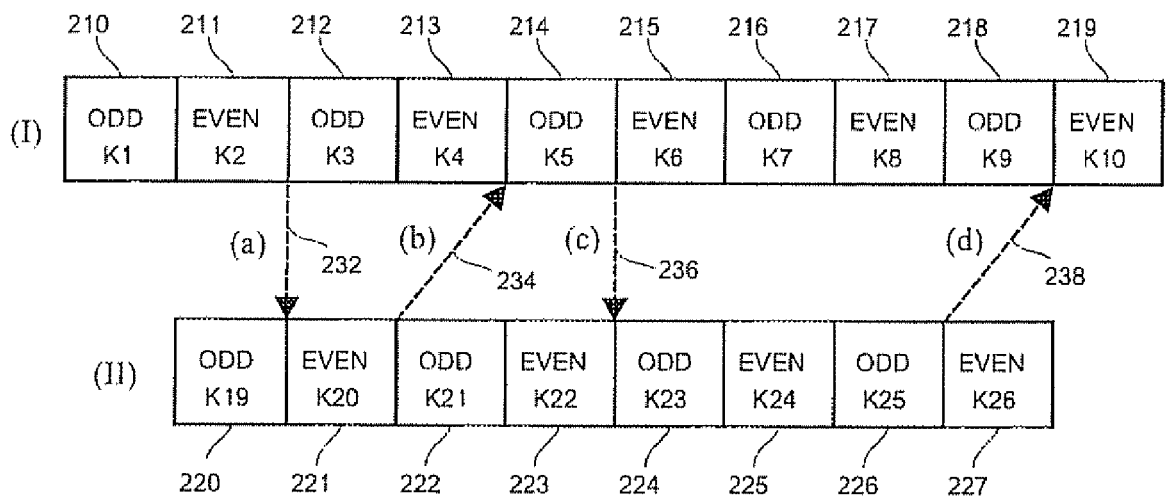
FIG. 2 is a diagram illustrating how packets are transported in accordance with the MPEG2 standard without consideration of the side effects of switching between two files, according to the prior art

An entitlements control message (ECM) contains encryption information about the encryption specific to the program content which, in combination with a valid entitlements management message (EMM), can be used to derive an encryption key for decoding the content ECMs are typically embedded within the program content and due to the encryption mechanisms employed, cannot be used to derive valid encryption keys absent a valid EMM for the content EMMs also include conditional access information, such as information about when, how many times, and under what conditions the content may be viewed/played A technique that can be used to improve the security of encrypted streaming content such as VOD content is to change the cryptographic keys (encryption keys) at a plurality of points within the content In order to make it more difficult for "pirates" to steal these keys, it is desirable to use as many different cryptographic keys as possible used to encrypt a program's content FIG. 2 illustrates a situation wherein two MPEG-2 files (I) and (II) have been pre-encrypted for broadcast, each using more than one encryption key (K) For purposes of this discussion, the two files (I) and (II) are related to each other. For example the file (I) is a normal (standard) program (service) and the other file (II) is a special "trick-play" (TP) version (e g, fast forward and rewind effects) of the normal file (I) With VOD, the user is interactively able to transition between the two files (I) and (II)

The first file (I) comprises a sequence of groups (one or, more typically, multiple sequential ones) 210, 211, 212, 213, 214, 215, 216, 217, 218, 219 of MPEG-2 transport packets The second file (II) comprises a sequence (one or, more typically, multiple sequential ones) 220, 221, 222, 223, 224, 225, 226, 227 of MPEG-2 transport packets The second file (II) is suitably a special trick play file which is associated with the first file (I) which is a normal file In the first file (I), the first group 210 has (is assigned) an odd key number K1, the second group 211 has an even key number K2, the third group 212 has an odd key number K3, the fourth group 213 has an even key number K4, the fifth group 214 has an odd key number K5, the sixth group 215 has an even key number K6, the seventh group 216 has an odd key number K7, the eighth group 217 has an even key number K8, the ninth group 218 has an odd key number K9, and the tenth group 218 has an even key number K10. This fulfills the condition of the MPEG-2 standard that when packets are encrypted with a changing key, it is necessary to toggle between even and odd parity key numbers.

In the second file (II), the first group 220 has (is assigned) an odd key number K19, the second group 221 has an even key number K20, the third group 222 has an odd key number K21, the fourth group 223 has an even key number K22, the fifth group 224 has an odd key number K23, the sixth group 225 has an even key number K24, the seventh group 226 has an odd key number K25, and the eighth group 227 has an even key number K26 This fulfills the condition of the MPEG-2 standard that when packets are encrypted with a changing key, it is necessary to toggle between even and odd parity key numbers The user is able to interactively transition between the two files (I) and (II) Four types of transitions 232, 234, 236, 238 are possible, and are illustrated.

(a) 232, moving from an even key in the normal file (I) to an even key in the TP file (II)

(b) 234, moving from an even key in the TP file (II) to an odd key on the normal file (I)

(c) 236, moving from an odd key in the normal file (I) to an odd key in the TP file (II).

(d) 238, moving from an odd key in the TP file (II) to an even key in the normal file (I)

According to the MPEG-2 standard, when packets are encrypted with a changing key, it is necessary to toggle between even and odd parity key numbers In the case where only two keys are used, and the key numbers (designated as even and odd) actually denote only those two keys, no problem exists This is due to the fact that a switch is being made either between two even keys that are the same (transition 232 (a)), two odd keys that are the same (transition 236 (c)), or an odd/even transition is occurring between two keys that have already been calculated (transitions 234 (b) & 238 (d))

Figure 3:
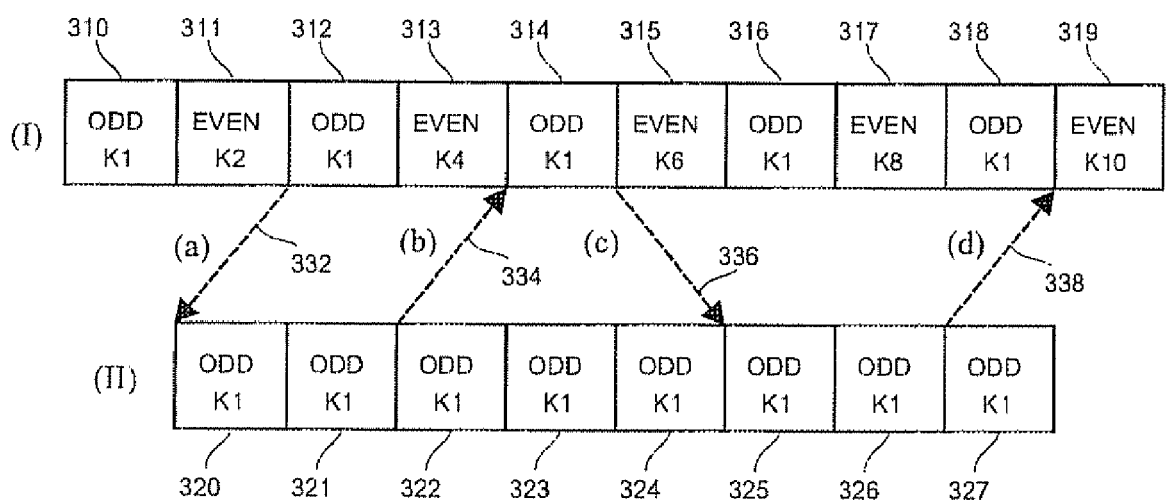
FIG. 3 is a diagram illustrating a modified approach to pre-encrypting content in accordance with a preferred embodiment of the invention

In a more general case where each key number identifies a unique key (as illustrated in FIG. 2), several problems can arise. One problem is that the VOD server (e g, 134) has to identify, ahead of time, which entitlement control message (ECM) to send that will allow the proper key to be generated by the decryption processor If the next key number is always guaranteed to be of the opposite parity (odd or even) than the current key, and the MPEG-2 transport packets are marked appropriately, then this technique will work. However, in the case where the key number is changing at some rate in both the normal stream (I) and the trick play stream (II) there is no way to guarantee that when keys are changed they will always be of opposite parity Without such a guarantee, switching between two different keys of the same parity (transitions 232 and 236) can occur This can result in a "race condition" between key calculation and key application that cannot be solved, except in very specific cases The MPEG-2 transport identifies odd and even parity in the Scrambling Control bits, to avoid exactly this race condition. According to the invention, a technique is provided for switching between two different keys of the same parity, without causing such a race condition An example of a specific case, such as is referred to in the previous paragraph, is one where both the delivery time of the ECM and the calculation and application time of the 'next' key can be guaranteed so that even key 'K2' will be switched out for even key 'K20' at exactly the right time. The magnitude of this 'right time' can be on the order of 400 microseconds with content being delivered at 3 75 Mbps A method other than the one defined by MPEG to synchronize the key switch would have to be created FIG. 3 illustrates an embodiment of a technique for pre-encrypting content in accordance with the invention. The technique relies on the playout of ECMs done on time (in real time), but removes the even/odd parity problem. In particular, the trick play (TP) file (II) is encrypted with only one key K1 (even or odd parity) The normal file (I) has one dynamic key (odd or even) and one fixed key (even or odd)

A fixed key is one that does not change, it is static A dynamic key is a changing key The rate at which the dynamic key changes is not the focus of the present invention. What is important is that the dynamic key changes during the course of playout of a file For purposes of this discussion, the two files (I) and (II) are related to each other For example, the file (I) is a normal (standard) program (service) and the other file (II) is a special "trick-play" (TP) version (e.g., fast forward and rewind effects) of the normal file (I) The user is interactively able to transition between the two files (I) and (II)

The first file (I) comprises a sequence of groups (one or, more typically, multiple sequential ones) 310, 311, 312, 313, 314, 315, 316, 317, 318, 319 of MPEG-2 transport packets The second file (II) comprises a sequence (one or, more typically, multiple sequential ones) 320, 321, 322, 323, 324, 325, 326, 327 of MPEG-2 transport packets The second file (II) is suitably a special trick play file which is associated with a the first file (I) which is a normal file.

In the first file (I), the first group 310 has (is assigned) an odd key number K1, the second group 311 has an even key number K2, the third group 312 has an odd key number K1, the fourth group 313 has an even key number K4, the fifth group 314 has an odd key number K1, the sixth group 315 has an even key number K6, the seventh group 316 has an odd key number K1, the eighth group 317 has an even key number K8, the ninth group 318 has an odd key number K1, and the tenth group 318 has an even key number K10 This fulfills the condition of the MPEG-2 standard that when packets are encrypted with a changing key, it is necessary to toggle between even and odd parity key numbers In the second file (II), the first group 320 has (is assigned) an odd key number K1, the second group 321 has an odd key number K1, the third group 322 has an odd key number K1, the fourth group 323 has an odd key number K1, the fifth group 324 has an odd key number K1, the sixth group 325 has an odd key number K1, the seventh group 326 has an odd key number K1, and the eighth group 327 has an odd key number K1 Since K1 of first file (I)=K1 of second file (II), this means that because the key isn't changing in the trick play file (it is the defined 'odd' key in use), the MPEG2 payload encryption bits also are always the same The segments in file (II) denote the acceptable entry points into the file MPEG-2 I frames take up more than one transport packet and because of this, entry into the (II) file is restricted to specific entry points Generally stated, the technique illustrated in FIG. 3 comprises encrypting the first file (I) according to a first encryption scheme and encrypting the second file (II) according to a second encryption scheme In the described embodiment, the first encryption scheme has a fixed key alternating with a changing key, and the second encryption scheme uses a fixed key which has the same parity as the fixed key of the first encryption scheme.

It should be understood that it is possible, but not preferred, that the second/special/trick file would have more than one key (a changing key) It can be done, however it would place undesirable restrictions on navigating the file. For example, (1) entry and exit from the trick play file could be managed so that the key change rule is not violated This would mean that either (a) very limited entry and exit points would be defined or (b) multiple trick play files would be encrypted in such a way that entry into a trick play file would not violate the key change rules, (2) files could be encrypted at a very high key change rate so that the opportunities for entry and exit from the trick play file were much greater; but they would still have to be managed, and it would place a greater burden on ECM delivery rates. In both of these cases, file navigation would have to be aware of the constraints of the encryption system. In contrast thereto, the present invention makes the encryption totally transparent to the file navigation In the system of the invention, the user is able to transition interactively between the two files (I) and (II). Four transitions are possible, and are illustrated. Assuming, for example, that the trick play file (II) is encrypted with only an odd parity key number (K1, as illustrated) and the key is static, four types of transitions 332, 334, 336, 338 are possible These are.

(a) 332, moving from an even key in the Normal file (I) to an odd key in the TP file (II)

(b) 334, moving from an odd key in the TP file (II) to the same odd key on the Normal file (I)

(c) 336, moving from an odd key in the Normal file (I) to the same odd key in the TP file (II)

(d) 338, moving from an odd key in the TP file (II) to an even key in the Normal file (I).

Transitions 332 (a) and 338 (d) rely on playing out the ECM ahead of time so that the MPEG-2 scrambling control bits can signal when to change the decryption key. Transitions 334 (b) and 336 (c) become trivial because the odd key is the same key (K1) in both cases It is possible, in some cases, that some Access Control implementation may have to send a different ECM even in cases 2 and 3, but the actual decryption key calculated can be the same. Thus, a glitch in decryption is avoided.

It should be noted that a particular implementation may require the ECMs to be unique—i e., an ECM cannot be simply replayed to derive a key or the system disallows reuse of an ECM However such implementations are generally required to be able to encrypt any random key to generate an ECM, so even if they have to send a 'different' ECM, the key generated by that ECM would have to be the same An advantage of the present invention is that it is possible to just be able to store the odd key (and not recalculate it) because it never changes. Some other system may not have the option to not recalculate it, but that is acceptable as long as the ECM is sent ahead of time An off-line encryption station (OLES) can be used to process MPEG files (e g, from a VOD server) and encrypt them prior to being placed back on the VOD server for delivery to consumers (See, e.g., FIG. 1) It may be preferable for the OLES to encrypt the normal file first A predefined indication (such as, for example, a data tag or header bit) can be used to indicate that a trick play file is appended to the normal file. After encryption of the normal file, the trick play file is encrypted and appended to the normal file In this manner, encryption of an entire movie or the like can be efficiently completed.

It should be understood that the order in which the files are pre-encrypted is somewhat arbitrary, and based largely on convenience. Under normal circumstances, it may be simply be easier to tack on the trick play file at the end of the normal file when encrypting. The invention is not limited by the order in which the files are encrypted.

It should be appreciated that numerous modifications and adaptations may be made in accordance with the present invention For example, the normal file can be encrypted using a dynamic key stream of one parity alternating with a fixed key of the opposite parity, while the trick play file is encrypted with a fixed key having either the even or the odd key. The reason for this is when a transition occurs, it either has to be a different parity or the key has to be the same exact key. Other modifications and adaptations will be apparent to those skilled in the art.

What is claimed is:

1. A method for delivery of pre-encrypted program content comprising: encoding master content into digital form; encrypting the master content in its entirety; storing the encoded, encrypted content in a VOD server from which it can be broadcast, on demand, to end-users; wherein: the master content comprises a first file and a second file which is associated with the first file; the first file is encrypted according to a first encryption scheme using a fixed key having a fixed parity alternating with a changing key having a second parity opposite the fixed parity; the second file is encrypted according to a second encryption scheme using the fixed key; and in response to a request from an end-user, delivering the encoded, encrypted content to the end-user.

2. A method in accordance with claim 1, wherein the first file is a normal file and the second file is a scene branch file.

3. A method in accordance with claim 1, wherein the first file is a normal file and the second file is an alternate camera angle file.

4. A method in accordance with claim 1, wherein: the master content is encoded using the MPEG-2 standard.

5. A method in accordance with claim 1, wherein: the first file is a normal file; and the second file is a trick play file.

6. A method in accordance with claim 1, wherein: the second file is appended to the first file.

7. A method in accordance with claim 1, wherein: the second file is encrypted after the first file is encrypted.

8. A method in accordance with claim 1, wherein: the first file is a normal file; the second file is a trick play file; the second file is encrypted after the first file is encrypted; and the encrypted second file is appended to the encrypted first file.

9. A method for delivery of pre-encrypted program content comprising:
   encoding master content into digital form;
   dividing the master content into first and second files, wherein the first file includes a first sequence of groups of transport packets and the second file includes a second sequence of groups of transport packets;
   encrypting alternating groups in the first sequence with a fixed key and encrypting remaining groups in the first sequence with a changing key;
   encrypting each of the groups in the second sequence with the fixed key;
   storing the encoded, encrypted master content in a VOD server from which it can be broadcast, on demand, to end-users; and
   in response to a request from an end-user, delivering the encoded, encrypted content to the end-user.

* * * * *